(No Model.) 2 Sheets—Sheet 1.
W. S. TUTTLE.
METALLIC FRAME JOINT.
No. 599,541. Patented Feb. 22, 1898.
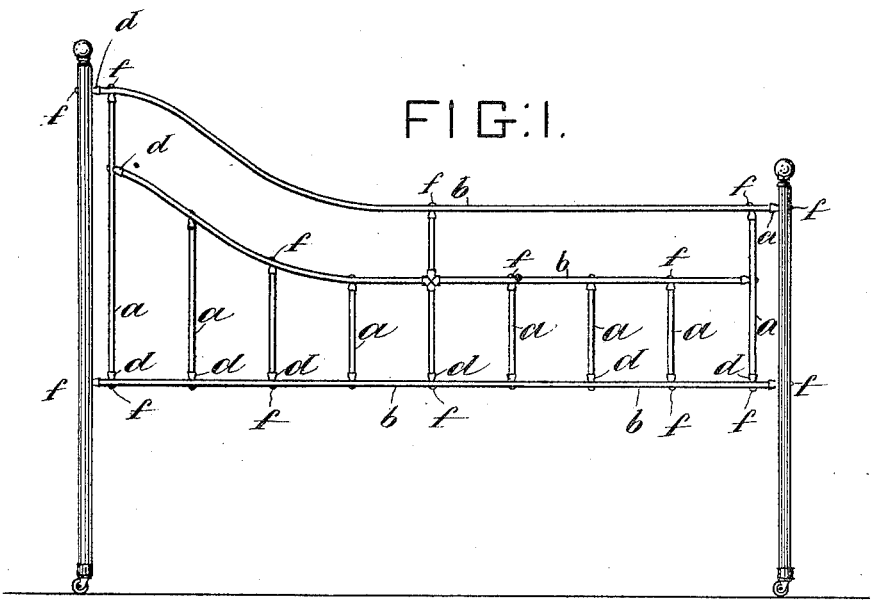
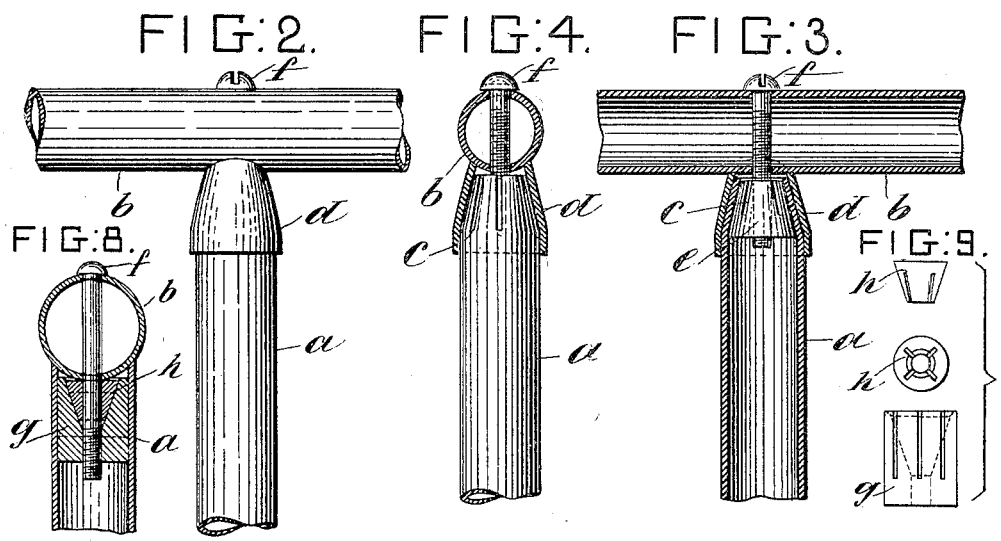
WITNESSES:
INVENTOR
Willard S. Tuttle
BY
A. P. Thayer
ATTORNEY (No Model.) 2 Sheets—Sheet 2.
W. S. TUTTLE.
METALLIC FRAME JOINT.
No. 599,541. Patented Feb. 22, 1898.
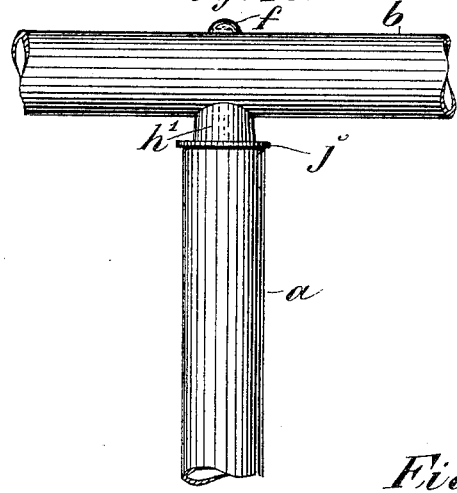
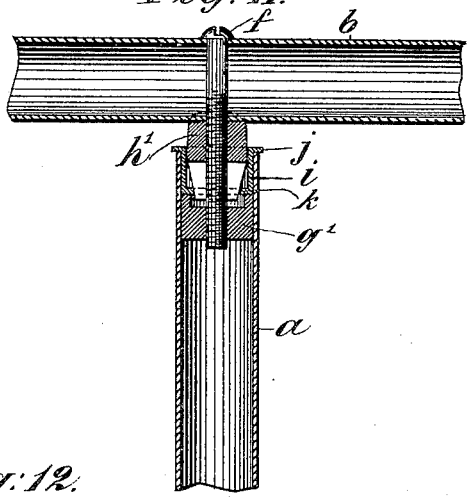
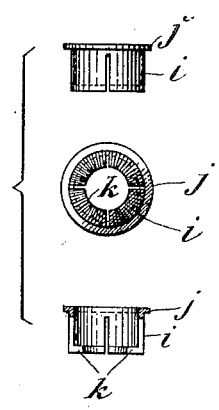
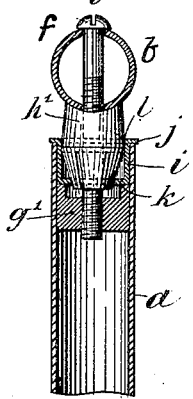
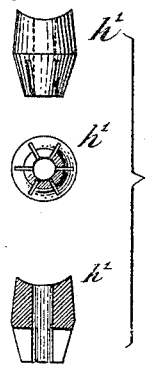
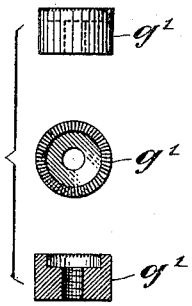
WITNESSES:
INVENTOR
Willard S. Tuttle
BY A. O. Thayer
ATTORNEY

UNITED STATES PATENT OFFICE.

WILLARD S. TUTTLE, OF BROOKLYN, NEW YORK.

METALLIC-FRAME JOINT.

SPECIFICATION forming part of Letters Patent No. 599,541, dated February 22, 1898.

Application filed May 6, 1897. Serial No. 635,309. (No model.)

*To all whom it may concern:*

Be it known that I, WILLARD S. TUTTLE, a citizen of the United States, and a resident of Brooklyn, in the county of Kings and State of New York, have invented certain new and useful Improvements in Metallic-Frame Joints, of which the following is a specification.

My invention consists of improvements in joints for connecting the members of metallic frames made of tubes or partly of tubes and partly of solid rods or bars, as bedsteads and the like, structures which are generally handled in parts that are detachably connected for use, whereby it is designed to provide more substantial and reliable joints, as hereinafter described, reference being made to the accompanying drawings, in which—

Figure 1 is a side elevation of a metallic bedstead made with joints in accordance with one form of my invention. Fig. 2 is a side elevation of a joint as in Fig. 1 on a larger scale. Fig. 3 is a sectional elevation of said joint. Fig. 4 is a sectional elevation of said joint in a plane at right angles to the plane of the section of Fig. 3. Fig. 5 is an end view of one of the frame members to be connected. Fig. 6 is an end view of the nut employed in clamping the parts together. Fig. 7 is a sectional elevation of the nut. Fig. 8 is a sectional elevation of a joint embracing my invention, but differing somewhat in the forms of some of the parts. Fig. 9 represents some of the parts of the joint of Fig. 8 separated from the other parts. Fig. 10 is a side elevation, and Fig. 11 is a sectional elevation, of my improved joint with some of the parts in other modifications of forms. Fig. 12 is a transverse section of Figs. 10 and 11 on line 2 2. Fig. 13 represents side, end, and sectional views of an expanding bush used in the modification of Figs. 10, 11, and 12. Fig. 14 represents side, end, and sectional views of a screw-gripping and bush-expanding cone and bearing-piece for one of the frame members of the joint of Figs. 10, 11, and 12. Fig. 15 is a face view and sectional view of the nut in the said joint of Figs. 10, 11, and 12.

The essential feature of the invention is some form of bearing-piece for the end of a tubular frame member against the side of the other frame member, an expanding device, and screw for expanding the same to grip the end of the tubular member and clamp it or the bearing-piece to the side of the other frame member.

Where the end of one member of a frame, as a tube $a$, is to be connected to another member, as a tube $b$, or a rod or bar, I make, in one form of my invention, several slits $c$ for a short distance lengthwise of member $a$ and contract the slitted portion into a taper form by forcing it into a taper-die or in any other way that may be feasible, then provide a taper-socket $d$, adapted to receive the taper end of member $a$ and having its small end suitably notched to fit against the side of member $b$ for the bearing-piece of the end of member $a$ against the side of $b$, and also provide a taper and slitted nut $e$, adapted to enter within the taper end of member $a$ to receive a clamping-screw $f$, inserted through member $b$, suitably perforated at the place where member $a$ is to be connected, and screwed into the nut, so as to draw it in the taper part of member $a$ and firmly clamp said part $a$ in the socket, also clamp socket $d$ against the side of $a$, and also at the same time cause the slitted portion of the nut to contract on the screw in a manner by which it serves as a check-nut to hold the screw against working slack.

It will be seen that such a joint is simple and cheap and is well adapted for keeping tight in use. The socket may be stamped and the nut also, and the member $a$ may be slitted and tapered quickly and cheaply.

Instead of the taper-socket and the split and taper form of the end of the member $a$ an elongated and taper-socketed split nut $g$ may be inserted in the member $a$, with a taper-contracting plug $h$ on the screw between said nut and the side of member $b$, so that the nut being drawn on the plug will be expanded tightly in the member $a$ and the plug will be contracted on the screw. In this case the end of member $a$ may bear against the side of member $b$, and the head of plug $h$ will also bear thereat for reinforcement of the end bearing of said member $a$ and as an element of the clamp.

Instead of splitting part of the nut $g$, as in Figs. 8 and 9, to expand in the end portion of member $a$ I will in some cases provide a shorter nut $g'$ with a separate expanding bush $i$, said bush preferably having a flange $j$ to abut against the end of member $a$, and said bush being inserted after the nut, with a contracting taper-plug $h'$ on the screw to expand the bush and form the bearing-piece of member $a$ against the side of member $b$.

To expand the bush $i$ mainly at the inner end, and thus locate the stress at some distance inward of the end, where the tendency to split the tube will be less, I form the bush with the bore so contracted thereat, as in an inward flange $k$, that the plug only acts thereon for expanding the bush. In this example the plug is made longer and forms the only bearing-piece against the side of frame member $b$. It is made to fit the mouth of the socket snugly at $l$ for best effects in supporting the end of member $a$.

It is to be noted that the bearing-piece, as well as the expanding and contracting devices, is detachably fitted to the member $a$, and is caused to engage and hold said member for the purposes of the clamp by the expanding devices, which avoids the expense of soldering or otherwise positively connecting it and facilitates substituting new pieces for broken or imperfect ones.

I claim—

1. In a joint for connecting the end of a tube to the side of another frame member, the combination with said members of a detachably-fitted bearing-piece between the end of the tube and the side of said other frame member, an expanding device in the end of the tube, and an expanding and clamping screw inserted through the other member and connected with the expanding device, said expanding device adapted for clamping the bearing-piece and the tube together and clamping the two members together by the operation of the screw, substantially as described.

2. In a joint for connecting the end of a tube to the side of another frame member, the combination with said members of a bearing-piece between the end of the tube and the side of said other frame member, an expanding device in the end of the tube, an expanding and clamping screw inserted through the other member and connected with the expanding device, and a contracting device for gripping and binding the screw, said expanding device adapted for expanding tightly in the tube and for clamping the two members together by the operation of the screw, and also for causing the contracting device to grip the screw, substantially as described.

3. In a joint for connecting the end of a tube, to the side of another frame member, the combination with said members of a detachably-fitted bearing-piece between the end of the tube and the side of said other frame member, an expanding device in the end of the tube consisting of an expanding bush, clamping-nut, and expanding-plug and a clamping-screw inserted through the other member and the expanding-plug, and connected with the nut, said expanding device adapted for expanding tightly in the tube, also for clamping the bearing-piece and the tube together and for clamping the two frame members together by the operation of the screw, substantially as described.

4. In a joint for connecting the end of a tube, to the side of another frame member, the combination with said members of a bearing-piece between the end of the tube and the side of said other frame member, an expanding device in the end of the tube consisting of an expanding bush, clamping-nut, and expanding-plug, and a contracting device for gripping the screw, consisting of a split portion of the expanding-plug, said expanding device adapted for expanding tightly in the tube and for clamping the two members together by the operation of the screw and also for gripping the screw, substantially as described.

Signed at New York, in the county of New York and State of New York, this 29th day of April, A. D. 1897.

WILLARD S. TUTTLE.

Witnesses:
A. P. THAYER,
JOSEPHINE HOWARD.